June 24, 1930.  R. P. PESCARA  1,766,682
SAFETY DEVICE FOR AIR COMPRESSORS
Filed April 6, 1927

Witnesses:

Inventor:
Raul Pateras Pescara
per Fred. F. Barlow
Attorney

Patented June 24, 1930

1,766,682

UNITED STATES PATENT OFFICE

RAUL PATERAS PESCARA, OF PARIS, FRANCE

SAFETY DEVICE FOR AIR COMPRESSORS

Application filed April 6, 1927, Serial No. 181,556, and in France April 10, 1926.

My invention relates to improvements in safety devices for air compressors in which direct acting driving pistons are used and in which the length of stroke of said pistons is determined solely by the amount of energy imparted to said pistons and the resistance encountered by them during their displacement.

The object of the invention is to provide a safety device for a machine of the type indicated in which the compressed air is injected into the air storage tank of the apparatus by means of one or more auxiliary cylinders with compressing pistons therein instead of directly by the main compressing cylinders of the apparatus.

Another object of the invention is to provide a safety device of the character indicated which shall absorb only a constant quantity of energy for its operation even though the pressure of the air in the storage tank should fall below normal.

Still another object of the invention is to so arrange and dispose the parts of the apparatus in such a manner that in case of rupture of the usual valves in the main compressing cylinders, the air in the storage tank cannot invade the main compressing cylinders and act on the pistons so that the air contained in the storage tank is amply guarded from escape during the time the compressor is at rest.

Other objects of the invention will be obvious to those skilled in the art in the following specification when taken in conjunction with the accompanying drawing in which—

Figure 1:
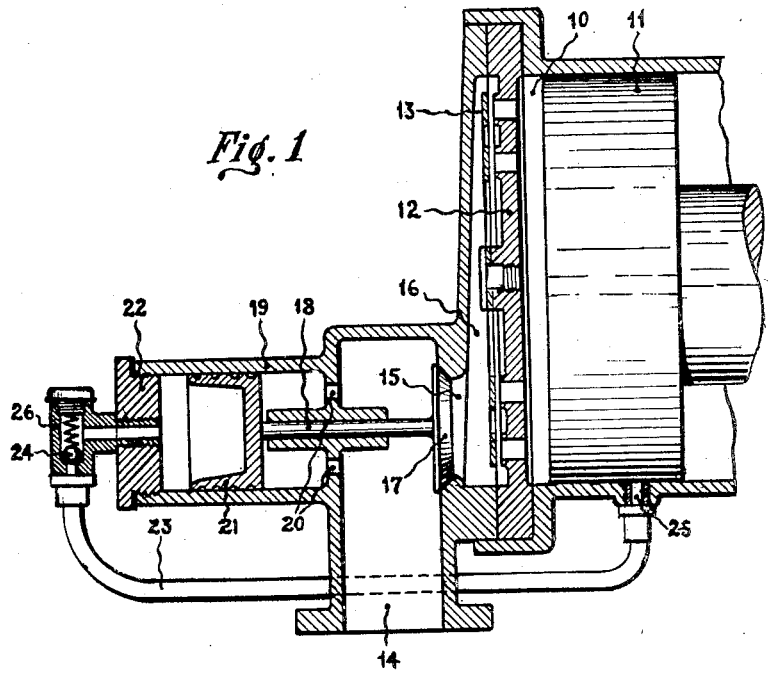
Figure 2:
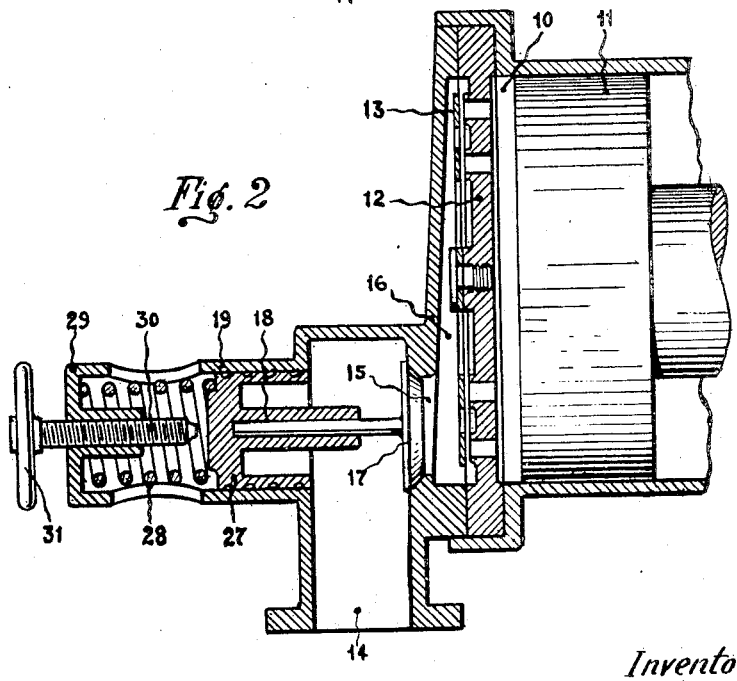

Fig. 1 illustrates a sectional view of part of a compressor with my invention applied thereto; and Fig. 2 is a similar view of a modification.

Referring to the drawing and particularly Fig. 1, 10 represents a main compressing cylinder of an air compressor in which slides a piston 11. The compressing of the air takes place in the usual manner through the cylinder head 12 provided with a plurality of openings which are closed by means of the automatic one-way valves 13. The air moves through a chamber 14 which communicates with the air storage tank, not shown in the drawing. A collecting chamber 16 is provided on the interior of the cylinder head and communicates with the chamber 14 through an orifice 15. Said orifice is furnished with a valve 17, and, as shown opens when moved in the direction of the chamber 14. Valve 17 is provided with a stem 18 and disposed concentrically therewith is a cylinder 19 which opens into the chamber 14 through openings 20. A piston 21 slides in cylinder 19 independently of the stem 18 but is arranged to abut the extremity thereof.

The said piston 21 is constructed in such a manner that its effective area is equal to the mean area of the conical orifice 15. The open end of the cylinder is sealed with a plug 22. An orifice 25 is provided in the wall of the cylinder 10 and communicates with the interior of cylinder 19 by means of a tube 23 and a fitting 26 screwed into the plug 22. The said fitting 26 is furnished with a ball 24 and acts as a valve, opposing the flow of air in the direction from cylinder 19 to orifice 25 but allowing the air to freely pass in the reverse direction.

The orifice 25 is placed in such a position in cylinder 10 that it is covered by piston 11 when the latter has reached the end of its stroke and compressed the air in cylinder 10.

The operation of my apparatus is as follows:

The storage tank to which the apparatus is connected is assumed to be void of compressed air. The piston 11 starts to move toward the cylinder head 12 and in so doing lightly compresses the air in cylinder 19 by means of tube 23 and fitting 26. This light pressure acts on the piston 21 and causes it to bear against the stem 18 and close valve 17 on its seat. As piston 11 continues to move, the pressure on the face of valve 17 and on the opposing piston 21 increases, valve 17 keeping the orifice 15 closed. When the edge of the piston 11 reaches the opening 25, however, the cylinder 19 becomes shut off from cylinder 10 and the pressure in the former cylinder ceases to increase. The movement of piston 11 continues; as soon as the pressure in cylinder 10 overcomes the back pressure exercised by piston 21 on valve 17, said valve opens and allows the air of cylinder 10 to be pushed into the storage tank. From the foregoing it will be obvious that the work necessary to compress the air and inject it into the storage tank will be quite the same whether the storage tank be empty or operating under normal pressure.

During the back stroke of piston 11 the valve 17 remains constantly closed due to the force exerted upon its stem 18 by the piston 21, which force remains constant and equal to the pressure at which the air was pushed into the storage tank, due to the fact that the ball 24 opposes the escape of any air from the cylinder 19 into the cylinder 10. The compressor therefore operates under constant load conditions regardless of what the pressure in the storage tank may be.

As the storage tank gradually becomes filled with compressed air, the back pressure thereof acts both upon the surface of piston 21 and the valve 17. It is evident that the two forces acting on these elements must balance each other automatically since the surface of the piston 21 is equal to the effective surface of the valve 17. Thus the force which maintains valve 17 on its seat will always be equal to the equivalent force produced by the normal working pressure of the apparatus regardless of what the pressure in the storage tank may be.

Finally when the storage tank is brought up to pressure, the piston 21 becomes completely balanced and no longer exercises an action on the valve stem 18. At the same time the valve 17 is subjected to equal pressure on both of its faces. As the pulsations of compressed air coming from cylinder 10 tend to constantly open the valve 17, the latter slowly follows the piston 21 in the direction of the plug 22 of cylinder 19, the compressed air contained in said cylinder 19 on the side of the piston toward plug 22 escaping slowly to the other side of the piston due to the necessary loose play between the piston and the walls of cylinder 19. This gradual escaping of the air from one side of the piston to the other does not affect the function of the device when the storage tank is below its normal working pressure because the pressure in cylinder 19 on the side toward member 22, under such conditions, is constantly maintained by the air coming from cylinder 10 each time the piston 11 moves toward the opening 25 and in this manner renews the pressure in cylinder 19 should it tend to fall below its normal value.

The valve 17 also serves as a safety-valve in case of rupture of the main automatic valves 13. Under such conditions the valve 17 becomes seated and prevents the air from entering cylinder 10 from the storage tank. When the machine is at rest the air in chamber 16 leaks out either through imperfections in valves 13 or through the joints of the apparatus. The valve 17 in closing orifice 15 also prevents the wasting of air contained in the storage tank.

Referring to Fig. 2, the embodiment illustrated therein is precisely the same with regard to elements 10 to 18. A similar cylinder 19 is provided which communicates directly with chamber 14. In the cylinder 19 slides a piston 27 which can move independently of the valve stem 18 but serves as a guide for said stem and can abut against the extremity thereof as before. The relation of the cross-section of piston 27 with respect to that of orifice 15 is precisely as previously described.

A spring 28 bears against piston 27 at one end and at the other end against a fixed part 29 carried by cylinder 19. Spring 28 is adapted to exercise a constant pressure equal to that of the normal working pressure against the piston 27. A threaded rod 30 carries a hand wheel 31 and permits whenever necessary to seat the valve 17 through the medium of piston 27.

The embodiment just described functions in substantially the same manner as that previously disclosed. The action of the spring 28 in this case takes the place of the compressed air admitted by tube 23 previously. The closing of the valve 17 by means of the hand-wheel 31 assures a tighter closing of the valve 17 in case of a prolonged stopping of the machine.

Having thus described my invention, what I claim as new and desire to secure by Letters Patent is—

1. In an air compressor the combination of a cylinder, a directly actuated compressing piston therein, outlet valves in said compressing cylinder and means controlled by said piston for exerting a predetermined pressure thereon when the load thereon falls below a predetermined pressure.

2. In an air compressor the combination of a cylinder, a directly actuated compressing piston therein, outlet valves in said compressing cylinder, a normally closed auxiliary valve operated by said piston and means opposing the opening of said auxiliary valve controlled by said piston whereby a predetermined pressure is exerted on said piston when the load thereon falls below a predetermined pressure.

3. In an air compressor the combination of a cylinder, a directly actuated compressing piston therein, outlet valves in said compressing cylinder, a normally closed auxiliary valve opposing the compressing action of said compressing piston, an auxiliary cylinder, a piston in said auxiliary cylinder opposing the opening of said valve and means controlled by said compressing piston for exerting a predetermined pressure on said auxiliary piston when the load on said compressing piston falls below a predetermined pressure.

4. In an air compressor the combination of a cylinder, a directly actuated compressing piston therein, outlet valves in said compressing cylinder, a normally closed auxiliary valve opposing the compressing action of said compressing piston, an auxiliary cylinder, a piston in said auxiliary cylinder opposing the opening of said valve, said compressing cylinder having an orifice closed by said compressing piston near the end of its stroke and means for connecting said orifice to said auxiliary cylinder whereby a predetermined pressure is exerted on said auxiliary piston when the load on said compressing piston falls below a predetermined pressure.

5. In an air compressor the combination of a cylinder, a directly actuated compressing piston therein, outlet valves in said compressing cylinder, a normally closed auxiliary valve opposing the compressing action of said compressing piston, an auxiliary cylinder, a piston in said auxiliary cylinder opposing the opening of said valve, said compressing cylinder having an orifice closed by said compressing piston near the end of its stroke, a tube connecting said orifice with said auxiliary cylinder whereby a predetermined pressure is exerted on said auxiliary piston when the load on said compressing piston falls below a predetermined pressure, and a one way valve in said tube for controlling the direction of air flowing therein.

6. In an air compressor the combination of a cylinder, a directly actuated compressing piston therein, outlet valves in said compressing cylinder, a normally closed auxiliary valve opposing the compressing action of said compressing piston, an auxiliary cylinder, a piston in said auxiliary cylinder opposing the opening of said valve, said compressing cylinder having an orifice closed by said compressing piston near the end of its stroke, a tube connecting said orifice with said auxiliary cylinder whereby a predetermined pressure is exerted on said auxiliary piston when the load on said compressing piston falls below a predetermined pressure, a coupling at one end of said tube, and a spring-pressed ball in said fitting normally closing the orifice in said tube for controlling the direction of the air flowing in said tube.

In testimony whereof, I have signed my name to this specification at Barcelona, Spain this 24th day of March 1927.

RAUL PATERAS PESCARA.